Patented May 23, 1944

2,349,434

UNITED STATES PATENT OFFICE 2,349,434

INSECT REPELLENT

Julius Hyman, Chicago, Ill., assignor to Velsicol Corporation, Chicago, Ill., a corporation of Illinois No Drawing. Application July 10, 1943, Serial No. 494,261

8 Claims. (Cl. 167—32)

This invention is a continuation-in-part of my co-pending application, Serial No. 444,397, filed May 25, 1942, and relates to novel compositions of repellent nature to a great variety of insects and allied forms of life, and particularly to a class of compounds found to possess insecticidal repellency of a comparatively high order and useful in relatively small proportions, and which are caused to be of enhanced utility and of lasting effect when combined with proper carriers.

More specifically my invention relates to the use of certain poly-methylated naphthalenes as an active ingredient of a repellent composition, in combination with a solvent fixative.

The present invention contemplates the use of the highest melting point isomers of the various poly-methylated naphthalenes, which appear to give the greatest repellency. Thus I have found 2,6-dimethylnaphthalene which is a white crystalline solid having a melting point of 110° C., and 2,3,6-trimethylnaphthalene which is likewise a white crystalline solid having a melting point of 102–103° C., to be most suitable as insect repellents. Similarly, 2,3,6,7-tetramethylnaphthalene being the highest melting of the tetramethylnaphthalenes may also be considered as coming within my class of useful compounds.

These poly-methyl naphthalenes may be prepared synthetically, or may be recovered from sources where they are present in moderate quantities such as in certain coal tar distillates, such as creosote oils, and in certain heavy petroleum fractions resulting from the dehydrogenation of aliphatic or hydroaromatic hydrocarbons, or the polymerization and consequent dehydrogenation of unsaturated hydrocarbons. For example, the distillate formed in the ordinary high-temperature coking operation contains a great variety of higher aromatics, along with sulfur compounds, tar acids, and nitrogen bases. Various methylated naphthalenes can be separated from this oil. However, the separation in this instance is not simple, because of the difficulty of freeing the hydrocarbons from the aforementioned unpleasant-odored sulfur compounds. Furthermore, the yields of alkylated naphthalenes produced from coal tar distillation is not particularly great.

A further example of the production of alkylated naphthalenes is found in the so-called hydroforming process for the dehydrogenation and reforming of light petroleum oils. In such process, which is carried out at moderate temperatures ranging between 800 and 1100° F., and moderately high pressures, in the presence of hydrogen gas and aluminaceous catalysts, there is produced a small proportion of heavier oils which contain alkylated naphthalenes. Another method for producing the poly-methylated naphthalenes from petroleum is by means of high temperature cracking of petroleum oils at relatively low pressures. It is possible to produce from such source oils very rich in alkylated naphthalenes, and which may be freed from all but small percentages of unpleasant sulfur compounds, tar acids, and nitrogen bases by further refining.

Although the use of the specific poly-methylated naphthalenes is contemplated in the purified crystalline form, it will be understood that I may use them in a substantially purified form and also in admixture with each other. Thus, for example, the employment of slightly impure 2,6-dimethylnaphthalene having a melting point of about 100° C., has been found satisfactory.

In the formulation of repellents it is, of course, desirable that their efficacy be preserved for as protracted a period as possible, and for economic reasons it is desirable that a minimum amount of the active constituent consistent with maximum repellent effect be employed. The poly-methylated naphthalenes contemplated herein have per se a tendency to directly vaporize or sublime under atmospheric conditions. However, their value as repellents does not apparently arise by reason of emanation of vapors but rather insects are repelled as a result of direct contact, and they may therefore be termed "touch repellents."

Thus in order to inhibit vaporization and to obtain a maximum distribution of a minimum amount of active material I incorporate the poly-methylated naphthalenes with a non-volatile solvent or "solvent fixative" by dissolving them therein. These solvent fixatives may be of any compatible material such as a heavy oil or wax such as, for example, petrolatum, mineral oils, bees wax, paraffin wax, cocoa butter or the like. They may be combined by melting the components and mixing them, the active repellent components being preferably not in greater proportion than that which remains dissolved in the solvent or fixative upon cooling to room temperature. For most insects a highly effective repellent may be formed by providing a composition with an average of about 5%, and which need not contain in excess of about 10% by weight of the active component. If desired I may employ up to about 20%, and on the other hand, effective repellents for certain insects have been produced with as little as 0.5% by weight of my poly-methylated naphthalenes. The choice of the solvent fixative will depend on the nature of the use of the repellent and the desired method of application. Thus for use as a household spray, or dairy cattle spray, I may use a paraffin oil of low volatility as the fixative solvent.

As examples of the repellency and lasting effect of my novel insect repellent compositions comparative tests were made on repellency toward houseflies by means of the chemotropometer apparatus and method described by Ingle in the February 1932 issue of the Journal of Economic Entomology (vol. 36, No. 1, pp. 108–10).

For the purpose of these comparative tests each of the test materials was incorporated in the indicated percentages with the same base oil, which was a deodorized paraffin oil exhibiting substantially no repellency per se under the same test conditions. The values given in the following table are in each case the difference in percentage of flies attracted to two screens based on the total number of flies on the two screens at the time of count, one being neutral and the other treated with the test material, the conditions of attraction to both of the screens being normally equal so that 50 per cent of the flies would be on each screen if each were neutral.

The actual percentage of flies repelled from or attracted to the treated screen may be expressed by the following relationship:

$$2\left(\frac{100 \times T}{(T+N)} - 50\right) = E$$

where
$T$ = flies on treated screen
$N$ = flies on neutral screen

A minus value for $E$ indicates repellency and a plus value attractiveness.

Thus, for example, where in accordance with the foregoing the total number of flies on the two screens at the time of count was 15, 12 being on the neutral screen and 3 on the test screen, the actual percentage of flies repelled from the treated screen would then be $$2\left(\frac{100 \times 3}{15} - 50\right) = -60$$

The following comparative results were calculated in accordance with the foregoing for percentage of flies actually repelled from the treated screen:

Thanite indicates that an 8% solution thereof was required to give an initial repellency equal to 5% of 2,6-dimethyl naphthalene but its effectiveness persisted a little more than half as long, and not even half as long as the effectiveness of a 6% solution of 2,3,6-trimethyl naphthalene, the 8% concentration of Thanite being its apparent maximum efficiency. Pyrethrum 20/1 is in itself a very poor repellent and its maximum efficiency was apparent at 15%, but in this concentration it gave an initial repellency which was significantly less than 2.5% or 5% of 2,6-dimethyl naphthalene or 6% of 2,3,6-trimethyl naphthalene, and its effective period was very short, being less than 45 minutes. Lethane 384 showed a maximum repellency at 30% and likewise showed relatively low initial repellency and poor lasting effect.

It will be understood that the foregoing comparative tests are merely for the purpose of illustration and not limitation and that my within described insect repellent compositions may similarly be used with good effect against other insects such as bedbugs, cockroaches, red spiders, aphids, mosquitoes and others. It will also be understood that I may incorporate in the fixative solvent other compatible natural or synthetic insect repellents and that I may use as the fixative solvent such materials as a refined hydrocarbon oil fraction containing methyl substituted naphthalenes as more particularly described in my aforementioned copending application Serial No. 444,397 and thus provide a fixative solvent which has some toxic and repellent properties per se.

I claim as my invention:

1. An insect repellent composition comprising a refined hydrocarbon oil fraction of a low volatility as a fixative solvent having dissolved therein as an active ingredient a poly-methyl naphthalene selected from the group consisting of 2,6-dimethyl naphthalene, 2,3,6-trimethyl naphthalene, and 2,3,6,7-tetramethyl naphthalene.

2. An insect repellent comprising a refined hydrocarbon oil fraction of a low volatility as a fixative solvent having dissolved therein as an active ingredient 2,6-dimethyl naphthalene.

3. An insect repellent comprising a refined hydrocarbon oil fraction of a low volatility as a

| Minutes after treatment | 2,6-dimethyl naphthalene | | 2,3,6-trimethyl naphthalene | | Thanite[1] 8% | Lethane 384[2] 30% | Pyrethrum 20/1 15% | 1,2-dimethyl naphthalene 5% |
|---|---|---|---|---|---|---|---|---|
| | 1.0% | 2.5% | 5% | 6% | | | | |
| 0 | −42 | −76.5 | −80 | −77 | −60 | −52 | −48 | −24 |
| 15 | −43 | −49 | −71.5 | −77 | −51 | −22 | −35 | −4 |
| 30 | −32 | −41 | −63 | −74 | −49 | −8 | −20 | |
| 45 | −27 | −40 | −60 | −71 | −40 | | −2 | |
| 60 | −15 | −22.5 | −51 | −66 | −33 | | | |
| 75 | −8 | −18 | −42 | −60 | −18 | | | |
| 90 | | −12 | −35 | −52 | | | | |
| 105 | | | −28 | −45 | | | | |
| 120 | | | −20 | −36 | | | | |
| 135 | | | −11 | −24 | | | | |
| 150 | | | | −20 | | | | |
| 165 | | | | −16 | | | | |

[1] Thanite, a commercial insecticide sold by Hercules Powder Co.
[2] Lethane 384, a commercial insecticide sold by Rohm & Haas.

From the foregoing table the greater suitability of 2,6-dimethyl naphthalene, the highest melting isomer of its group, will be apparent when compared to the results obtained when using a low melting isomer 1,2-dimethyl naphthalene, the former exhibiting much greater initial repellency, and a much greater lasting effect. The comparison with commercial preparations such as fixative solvent having dissolved therein as an active ingredient 2,3,6-trimethyl naphthalene.

4. An insect repellent comprising a refined hydrocarbon oil fraction of a low volatility as a fixative solvent having dissolved therein as an active ingredient 2,3,6,7-tetramethyl naphthalene.

5. An insect repellent composition comprising a substantially non-volatile, refined, relatively inert, compatible fixative solvent having dissolved therein a poly-methyl naphthalene selected from the group consisting of 2,6-dimethyl naphthalene, 2,3,6-trimethyl naphthalene and 2,3,6,7-tetramethyl naphthalene.

6. An insect repellent composition comprising a substantially non-volatile, refined, relatively inert, compatible fixative solvent carrying as an active ingredient 2,6-dimethyl naphthalene.

7. An insect repellent composition comprising a substantially non-volatile, refined, relatively inert, compatible fixative solvent carrying as an active ingredient 2,3,6-trimethyl naphthalene.

8. An insect repellent composition comprising a substantially non-volatile, refined, relatively inert, compatible fixative solvent carrying as an active ingredient 2,3,6,7-tetramethyl naphthalene.

JULIUS HYMAN.